United States Patent [19]
Hosegood

[11] 3,897,838
[45] Aug. 5, 1975

[54] NUCLEAR REACTOR POWER PLANT
[75] Inventor: Samuel Brittan Hosegood, Wareham Dorset, England
[73] Assignee: United Kingdom Atomic Energy Authority, London, England
[22] Filed: Feb. 8, 1973
[21] Appl. No.: 330,627

Related U.S. Application Data
[63] Continuation of Ser. No. 58,497, July 27, 1970, abandoned.

[30] Foreign Application Priority Data
Aug. 6, 1969 United Kingdom............. 39484/69

[52] U.S. Cl............................. 176/60; 176/65
[51] Int. Cl............................. G21c 15/00
[58] Field of Search.................. 176/65, 60, 87

[56] References Cited
UNITED STATES PATENTS
3,149,046  9/1964  Boyd............................. 176/60
3,185,631  5/1965  Long et al...................... 176/65
3,301,761  1/1967  Johnson et al.................. 176/65
3,371,017  2/1968  Coast et al..................... 176/65
3,461,034  8/1969  Fortescue....................... 176/65
3,663,364  5/1972  Thompson et al................ 176/65

FOREIGN PATENTS OR APPLICATIONS
799,212    8/1958  United Kingdom................ 176/60
1,144,172  3/1969  United Kingdom................ 176/60
1,185,261  2/1959  France......................... 176/60

Primary Examiner—Harvey E. Behrend
Attorney, Agent, or Firm—Larson, Taylor & Hinds

[57] ABSTRACT

A nuclear power plant has a main prestressed concrete pressure vessel housing the core, and, in pods, the heat exchangers, low power turbine, circulators etc., but a separate pressure vessel for the power turbine connected to the main vessel for the supply of working fluid. A greater flexibility of plant lay out results, for the position of the turbo-alternator line is independent of the main vessel.

9 Claims, 3 Drawing Figures

NUCLEAR REACTOR POWER PLANT

This is a continuation of application Ser. No. 58,497 filed July 27, 1970, now abandoned.

BACKGROUND TO THE INVENTION

This invention relates to nuclear power plant.

When a nuclear reactor is provided as a heat source for the working fluid to be employed in a power turbine, it is usual to site the reactor alongside the turbo alternator sets in an adjacent building. In some more advanced concepts however, it has been proposed to incorporate the turbines in the same concrete structure as the reactor core, and this may be advantageous especially in cases where the plant operates on a direct cycle in which the reactor coolant and working fluid are the same. One example of this arrangement previously proposed, entails locating a gas cooled reactor core in a common containment structure with its power turbines whose output shafts extend through suitable gas tight seals, to drive alternators. This arrangement can be studied in more detail with reference to UK Pat. No. 1,144,172 but as will be appreciated this system imposes certain restrictions on the disposition of the alternators and may not always constitute the best solution to a particular requirement.

SUMMARY OF THE INVENTION

According to the present invention a nuclear power station has at least one power turbine for driving a load, the turbine being housed in a pressure vessel, separate from that housing the reactor core, but interconnected by ducting for the supply of working fluid.

The reactor pressure vessel is preferably of prestressed concrete construction of cylindrical shape with holes or pods in the side wall for housing reactor coolant and power cycle auxiliaries. Ducting interconnects one or more of the holes with the pressure vessel housing the power turbine.

DESCRIPTION OF THE DRAWINGS

In order that the invention may be better understood one embodiment thereof will now be described with reference to the accompanying diagramatic drawings in which.

DESCRIPTION OF THE PREFERRED EMBODIMENT

Figure 3:
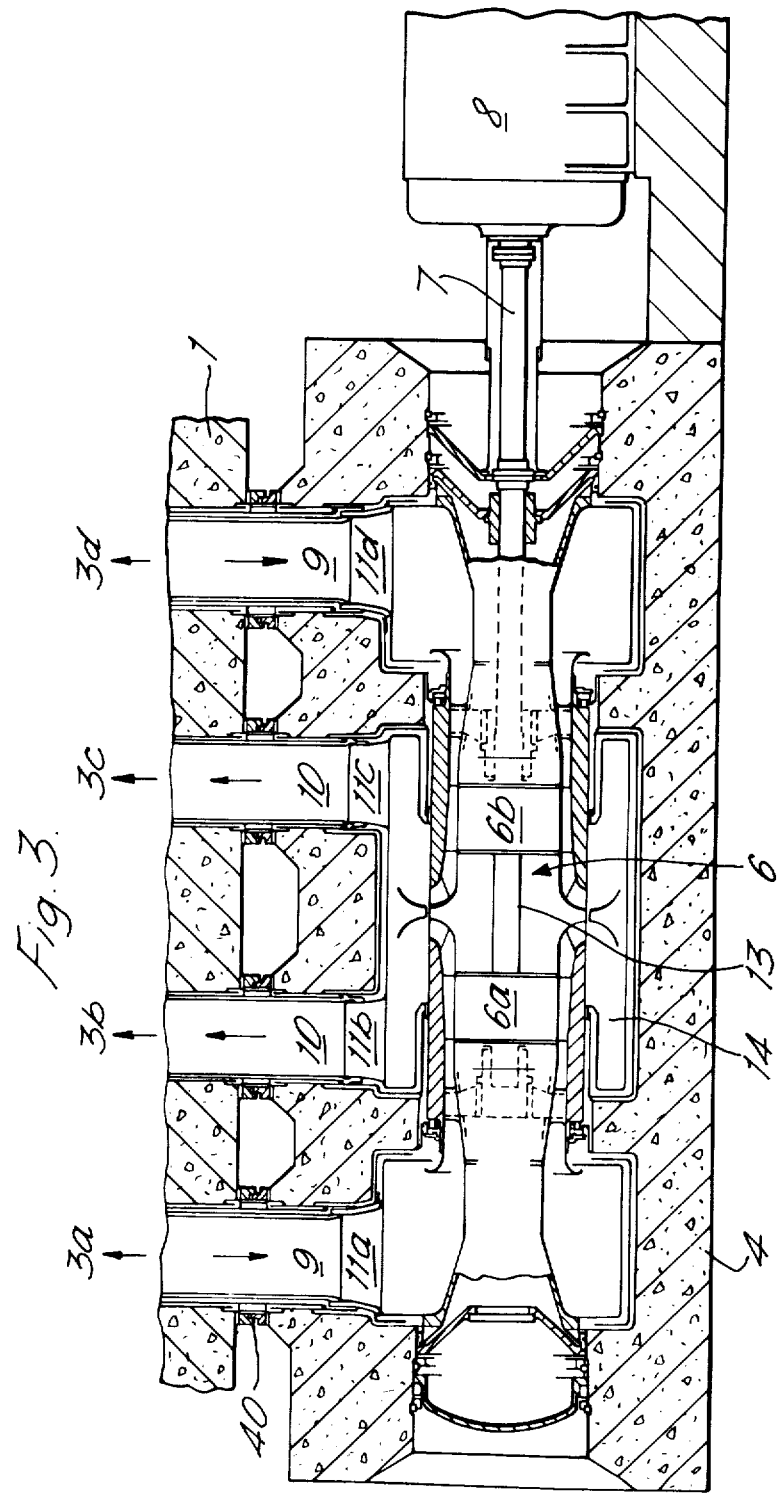
FIG. 3 is an axial cross section through one of the vessels containing a power turbine.

A main prestressed concrete pressure vessel 1 of right cylindrical shape houses a gas cooled reactor core 2 within its central bore 2a. Within the cylindrical side wall of the vessel, a number of pods 3 contain power cycle auxiliaries and act as coolant ducting. Beneath the main vessel 1 are located one, or, in this case, two smaller pressure vessels 4, 5 each of which contains a power turbine 6 whose output shaft 7 extends through a suitable seal in the vessel wall where it drives an alternator 8. The vessels 4, 5 are each structurally separate from the main vessel 1 but, as shown in the case of vessel 4, in FIG. 3 each is connected to the vessel 1 by two pairs of ducts 9, 10 through which working fluid for the power turbine 6 passes. Only one pair will be described here. Conveniently the ducts 9, 10 interconnect the vessel 4 with certain of the pods 3 in the wall of the main vessel 1. It will be appreciated that with the power turbine 6 housed in a separate vessel, the position of the turbine-alternator line is not restricted by the design of the main vessel and the alternator can be sited in any convenient attitude.

In this embodiment, two, minor, cylindrical pressure vessels 4, 5 are positioned with their longitudinal axes parallel to one another and symmetrically on each side of a horizontal centre line C.L. passing through the axis of the main pressure vessel. In the upper walls of these vessels at positions adjacent to the main vessel, four ports 11a – 11d are formed for the transfer of working fluid between the main vessel and the minor vessels via ducts 9, 10. The pods 3 are arranged in two sets of four 3a – 3d and 3e – 3h, each set being associated with each minor vessel 4, 5 respectively. The axes of the pods are pitched on a circle concentric with the main vessel side wall and their spacing is such that the outer pair 3a, 3d of each group may lie nearly coaxial with the outer pair 11a, 11d of the four holes in upper wall of the adjacent underlying minor pressure vessel and communicate therewith via ducts 9. In fact, by moving the axes of the vessels 4, 5 laterally and the turbo alternator shafts further apart, two of the holes in the upper wall of each of the vessels 4, 5 may be brought precisely coaxial with two of the pods in main vessel 1, if desired. The inner pair of pods 3b, 3c in each group may communicate with the inner two holes 11b, 11c in the upper walls of respective minor vessels via angled ducts in the concrete and short straight ducts 10. The ducts 9 each deliver hot working fluid to the power turbine 6 which is, in fact, a pair of low pressure turbines 6a, 6b mounted back to back on the same rotor 13.

Figure 1:
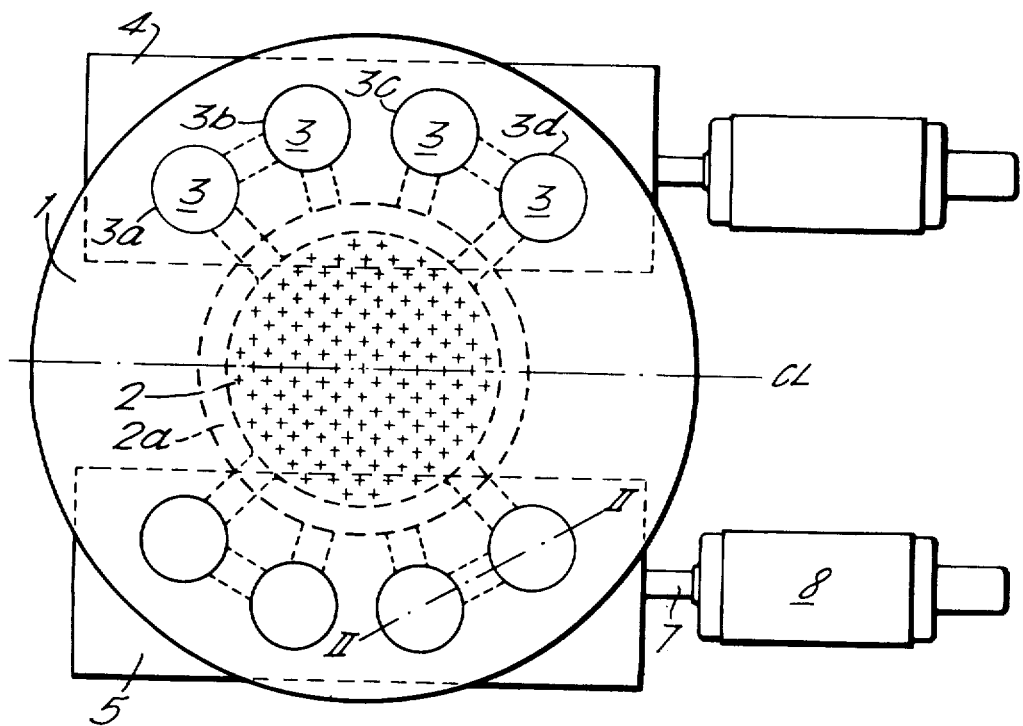
FIG. 1 is a plan of a gas cooled nuclear reactor power plant
Figure 2:
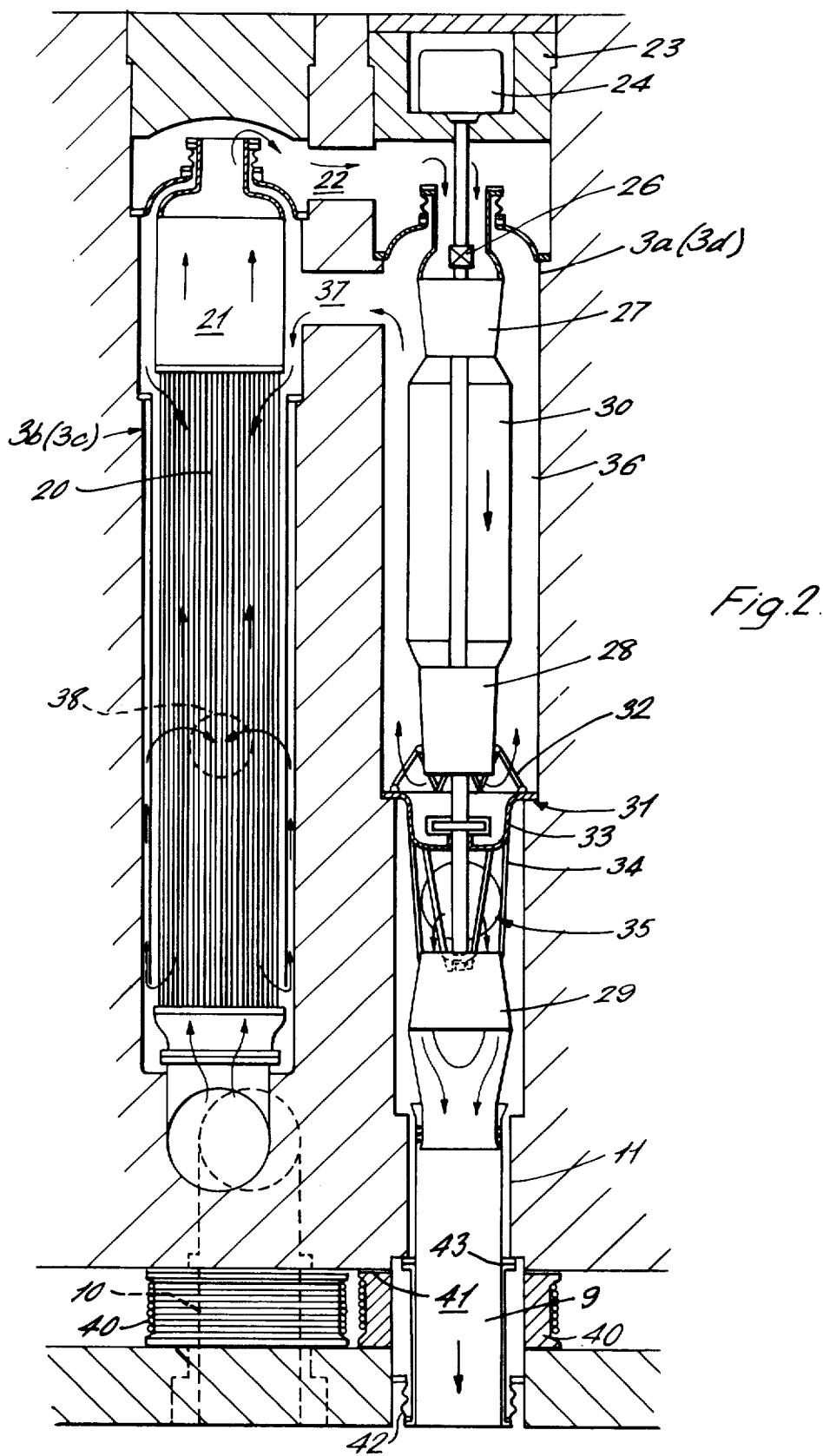
FIG. 2 is a cross-section on the lines II—II of FIG. 1.

From the turbines 6 the exhaust gas passes into annular passage 14 and into the ducts 10 via the adjacent ports 11b, 11c, to enter through suitably angled ducts in the concrete pods 3b (3c) FIG. 2. Further shown in FIG. 2 in the pods 3b 3c each is a recuperative heat exchanger 20 of the tube in shell type, the exhaust gas passing along the tube side and entering the pre cooler 21. From the latter, the cooled gas passes along a conduit 22 in the concrete inter-connecting the pod 3b (3c) with the adjacent pods 3a (3d). Each outer pod 3a, 3d comprise a long cylindrical cavity with a closure plug 23 at the top. In this case the plug is made hollow and accommodates a starter motor 24 (or alternatively a starter turbine which can be supplied with high pressure gas from a gas storage reservoir or other source of high pressure working gas) whose shaft can be coupled by a clutch 26 to accelerate low and high pressure compressors 27, 28 and high pressure turbine 29 all mounted on a common shaft, or on co-axial, shafts. An annular intercooler 30 is shown for clarity as disposed between the compressors though it may alternatively be located above, below or around the compressors, provided the gas ducting is so arranged as to conduct the gas through it on its way from the low pressure compressor delivery to the high pressure compressor intake. At a position along the pod adjacent the high pressure compressor, the pod wall is stepped to provide a shoulder 31 from which the turbo compressor machinery can be supported. To this end, struts 32 extending from the shoulder support the high pressure compressor casing whilst a dished plate 33 carries the main thrust race and struts 34 (which may be insulated and cooled by water or cool gas passing inside the insulation) for the lower high pressure turbine casing 29. The high pressure turbine is overhung from the thrust race a sufficient distance to allow for gas issuing from the reactor core and the coolant outlet plenum (which in the example shown is under the core) via duct 35 in the concrete to enter the turbine inlet guide vanes directly. The dished plate also serves as a seal between the turbine inlet gas and the pressurised but relatively cool gas delivered by the high pressure compressor. This latter gas flow is reversed to flow through an annular duct 36 back over the outside of the intercooler 30 and low pressure compressor casing to pass via a duct 37 in the concrete to the shell side of the heat exchanger 20 in ped 3$b$ (3$c$) where it acquires heat in counter flow heat exchange with low pressure turbine exhaust gas before entering the reactor core space via duct 38, each of the inner pods 3$b$, 3$c$, 3$f$, 3$g$ being connected to the central bore 2$a$ of the main vessel by at least one such duct 38. From these ducts the gas passes upwards in the annular space between the outside of the core 2 and the wall of the main vessel central bore 2$a$, to reach the reactor inlet plenum (which in this example is situated above the core); the gas then flows downwards through the core as coolant.

The coolant circuit through the core is not illustrated. The heated coolant emerges from the bottom of the core and leaves the core outlet plenum by duct 35 to enter the high pressure turbine 29 which drives the high and low pressure compressors 27, 28 each of the outer pods 3$a$, 3$d$, 3$e$, 3$f$ being connected to the reactor outlet plenum by at least one duct 35. The outlet gas from the turbine 29 passes directly along duct 9 and passes to the free running power turbine 6 which drives the alternator 8. The exhaust gas from the power turbine is recycled back to the reactor via duct 10.

It will be appreciated that if both the main vessel 1 and the smaller vessels 4 and 5 which house the low pressure turbines 6 are of pre-stressed concrete construction, the only parts of the main gas circuit which are not protected against sudden rupture by encasement in pre-stressed concrete are the ducts 9, 10 which join the main vessel 1 to the smaller vessels 4, 5. To limit the consequences of an accidental failure of one of these ducts, both in terms of the rate of depressurisation of the main gas circuit, and in respect of possible damage to surrounding buildings, plant and personnel, each duct is surrounded by a strong pre-stressed collar 40, which occupies the space between the upper side of the smaller vessel (4 or 5) and the under-side of the main vessel 1, leaving only a small clearance 41 between the upper end face of the collar and the underside of the main vessel.

The ducts 9, 10 may be removed and replaced by firstly gaining access to the appropriate smaller vessel, dismantling a bellows seal 42 and then unfastening the flanged joint 43 by long tools. The duct 9 can then be drawn into the smaller vessel 4, 5. At this stage the collar 40 may be removed by sliding it sideways between the main vessel and the smaller vessel 4, 5. The plant components may be removed by withdrawal through the pod mouths after first removing the respective closure members.

I claim:

1. A nuclear reactor power plant comprising an upright main prestressed concrete pressure vessel containing a gas-cooled nuclear reactor, a pair of subsidiary concrete pressure vessels disposed laterally beneath the main pressure vessel and spaced therefrom in side by side relationship with the vertical axis of the main pressure vessel extending therebetween, each of the subsidiary pressure vessels defining a cavity extending generally horizontally, two pairs of elongated pods within the thickness of the prestressed concrete walls of the main pressure vessel, the axes of each pair of pods extending downwardly to penetrate the cavity of a said subsidiary pressure vessel, a reactor coolant circulator and a circulator turbine drivingly connected thereto disposed in tandem in one of each pair of pods, a cooler disposed within the other of each pair of pods, a power turbine in each of said cavities, an alternator drivingly connected in tandem to each power turbine, a first series of ducts extending generally vertically between the pods and the cavities of the subsidiary pressure vessels, a second series of ducts extending generally horizontally between the pods and the reactor core, and means including said first and second series of ducts for connecting the reactor core, the circulator turbines, the power turbines, the heat rejection side of the coolers, the coolant circulators and the heat-receiving side of the coolers in series so as to form two closed reactor coolant circuits whereby the reactor coolant is used to drive the power and circulator turbines of the power plant.

2. A power plant as claimed in claim 1 wherein the upper ends of said pods extend to the upper surface of said main pressure vessel and means are provided for releasably covering said upper ends so as to allow withdrawal of the components disposed in said pods.

3. A power plant as claimed in claim 1 in which the power turbine comprises a single rotor supporting two sets of axial flow blading disposed to receive working fluid from a common duct leading from one of the pods in the wall of the reactor pressure vessel.

4. A power plant as claimed in claim 3 in which the exhaust from the power turbine is returned to the reactor vessel by further ducts.

5. A power plant as claimed in claim 1 in which a heat exchanger is located in said pod for cooling the turbine exhaust, said heat exchanger being accessible by way of communication afforded through the ducts joining the power turbine vessel with the reactor vessel.

6. A power plant as claimed in claim 1 in which the ducts are of prestressed material.

7. A power plant as claimed in claim 6 including a liner for the prestressed material whereby the said ducts are double contained.

8. A power plant as claimed in claim 7 in which the liner is removable from within the adjacent pressure vessel containing the power turbine.

9. A power plant as claimed in claim 1 in which the duct has a diameter over length ratio of not greater than one.

* * * * *